(12) United States Patent
Pai et al.

(10) Patent No.: US 12,734,996 B2
(45) Date of Patent: Sep. 15, 2026

(54) HEATING STICKER FOR VEHICLE WINDOW

(71) Applicant: CANATU FINLAND OY, Vantaa (FI)

(72) Inventors: Chih-Chiang Pai, Taoyuan (TW); Meng-Kuei Lin, Taoyuan (TW); Chun-Hao Huang, Taoyuan (TW); Jung-Han Liu, Taoyuan (TW); Chih-Jung Tsui, Taoyuan (TW)

(73) Assignee: CANATU FINLAND OY, Vantaa (FI)

( * ) Notice: Subject to any disclaimer, the term of this patent is extended or adjusted under 35 U.S.C. 154(b) by 1155 days.

(21) Appl. No.: 17/748,089

(22) Filed: May 19, 2022

(65) Prior Publication Data

US 2023/0373441 A1 Nov. 23, 2023

(51) Int. Cl.
*H05B 3/86* (2006.01)
*B60S 1/02* (2006.01)
*H05B 3/36* (2006.01)

(52) U.S. Cl.
CPC ................ *B60S 1/026* (2013.01); *H05B 3/36* (2013.01); *H05B 3/86* (2013.01); *H05B 2203/016* (2013.01)

(58) Field of Classification Search
CPC ...... H05B 3/84; H05B 3/845; H05B 2214/02; H05B 2203/01; H05B 3/86; H05B 3/34; H05B 3/20; H05B 3/36; H05B 3/145; H05B 2203/008; H05B 2203/013; H05B 2203/016; B60S 1/026

(Continued)

(56) References Cited

U.S. PATENT DOCUMENTS 3,636,311 A * 1/1972 Steger ...................... H05B 3/84 174/268
4,820,902 A * 4/1989 Gillery ............. B32B 17/10036 219/547

(Continued)

FOREIGN PATENT DOCUMENTS

KR 20120008432 U * 12/2012 ............ G06F 3/044

OTHER PUBLICATIONS

Canatu Launches High Transmittance CNB™ Transparent Conductive Film for Touch Sensors, [online], Apr. 2015. Retrieved from the Internet Jun. 20, 2025 <URL: https://web.archive.org/web/20150907045307/http://www.canatu.com/canatu-launches-high-transmittance-cnb-transparent-conductive-film-for-touch-sensors/>. *

*Primary Examiner* — Phuong T Nguyen
(74) *Attorney, Agent, or Firm* — Robert P. Michal, Esq.; Rimon PC

(57) ABSTRACT

A heating sticker includes a protective layer, a thermogenic layer, an electrode layer, a cover layer and an adhesive layer, which are superposed in order. The thermogenic layer is a conductive film with transparent carbon nanobuds and defined with a heating area and a non-heating area. The heating area is disposed with insulative grooves. The non-heating area is distributed with micro blocks which are arranged insulatively. The electrode layer has a conductive wire and a ground wire. The conductive wire surrounds the heating area in a non-closed shape. The ground wire is located between the front end and the rear end of the conductive wire and connected to a periphery of the heating area. Conductivity of each of the conductive wire and the ground wire is higher than conductivity of the thermogenic layer. An outer surface of the cover layer is a modified surface which is treated with plasma.

10 Claims, 6 Drawing Sheets

(58) Field of Classification Search
USPC ....... 219/203, 552, 202, 208, 522, 536, 541, 219/543, 549
See application file for complete search history.

(56) References Cited

U.S. PATENT DOCUMENTS

| | | | | | |
|---|---|---|---|---|---|
| 4,952,783 | A * | 8/1990 | Aufderheide | G02F 1/133382 | 219/528 |
| 5,208,444 | A * | 5/1993 | Winter | H05B 3/84 | 219/547 |
| 5,354,966 | A * | 10/1994 | Sperbeck | H05B 3/84 | 219/203 |
| 5,911,899 | A * | 6/1999 | Yoshikai | H05B 3/86 | 219/522 |
| 7,534,500 | B2 * | 5/2009 | Kobayashi | B29C 45/14811 | 428/458 |
| 8,357,881 | B2 * | 1/2013 | Feng | H05B 3/342 | 219/529 |

* cited by examiner

HEATING STICKER FOR VEHICLE WINDOW

BACKGROUND

Technical Field

The invention relates to transparent heating stickers, particularly to heating stickers for defogging vehicle windows.

Related Art

The temperature difference between the inside and outside of a car will cause water vapor to condense on the surface of the car glass, which will obstruct the driver's vision and endanger the driving safety. Therefore, a defogger is installed on the windshield of a car to eliminate the fog on the windshield. A current vehicle defogger is to embed a plurality of heating wires made of metal material into the windshield of a vehicle, and the defogging wires are arranged in parallel. The fog attached on the windshield can be dissipated by heating the windshield by the resistance of the defogging wires. However, when the traditional defogger operates, the heating area is concentrated near the heating wire, and other positions without the heating wires must be heated by thermal conduction, which not only prolongs the time required for defogging, but also causes internal stress on the windshield due to uneven heat distribution. After long-term repeated operation, it is easy to cause the glass to break and endanger driving safety. Furthermore, the heating wires of the traditional defogger are made of opaque metal material. Although the metal wires are tiny, it will not affect the driver's vision under normal conditions, when a headlight or the sun shines directly on the front windshield, the tiny metal wires will appear, which not only has a bad influence on appearance, but also hinders the driver's vision to endanger driving safety.

In order to improve the problems of obstructing the vision and unsightly appearance caused by the traditional metal wires embedded in a windshield, the industry has replaced the metal wires with strip-shaped transparent conductive films. The strip-shaped transparent conductive films as a heat source can effectively overcome the problem of clarity of the windshield, but the phenomenon of uneven distribution of the heating effect during the heating process and the drawback of a long time required to complete the defogging still cannot be improved. In addition, the aforementioned transparent conductive strips usually adopt indium tin oxide (ITO) conductive film. However, due to the characteristics of high fragility and poor ductility of the ITO film material, when the ITO conductive strips are attached to a non-fully-planar windshield, they are easy to break at bending portions, which results in the condition of non-conductivity and the loss of heating and defogging functions. This is an issue to be overcome.

SUMMARY

An object of the invention is to provide a heating sticker for a vehicle window, which has high clarity and can evenly heat up in a full area and rapidly defog a window.

To accomplish the above object, the invention provides a heating sticker, which includes a protective layer, a thermogenic layer, an electrode layer, a cover layer and an adhesive layer. The thermogenic layer is superposed on the protective layer and is a conductive film with transparent carbon nanobuds. The thermogenic layer is defined with a heating area and a non-heating area. The heating area is disposed with multiple insulative grooves. The non-heating area is distributed with multiple micro blocks which are arranged insulatively. The electrode layer is superposed on the thermogenic layer and has a conductive wire and a ground wire. The conductive wire surrounds the heating area in a non-closed shape. A front end and a rear end of the conductive wire are separately connected to current input contacts of a power cable. The ground wire is located between the front end and the rear end of the conductive wire. A front end of the ground wire is connected to a periphery of the heating area and a rear end of the ground wire is connected to a ground point of the power cable. Conductivity of each of the conductive wire and the ground wire is higher than conductivity of the thermogenic layer. The cover layer is superposed on the electrode layer. An outer surface of the cover layer is a modified surface which is treated with plasma. The adhesive layer is disposed on the outer surface of the cover layer. The heating sticker of the invention is adhered on a vehicle's window through the adhesive layer. When the conductive wire and the ground wire are electrified, the heating area will be heated by the electrothermal conversion. The insulative grooves in the heating area guide the current distribution to make the heat from the electrothermal conversion evenly distributed onto the whole heating area. This can rapidly heat up to perform the defogging effect, guarantee a driver's vision and avoid damage of components due to uneven temperature distribution.

In the heating sticker of the invention, the protective layer is made of, but not limited to, polypropylene (PP), polyethylene (PE), polystyrene (PS), polymethylmethacrylate (PMMA), polycarbonate (PC), polyethylene terephthalate (PET), polyvinyl chloride PVC), polyimide (PI) or polyurethane (PU). Any flexible or soft transparent film is available.

In the heating sticker of the invention, a surface resistivity of the thermogenic layer is between 60 Ω/sq and 350 Ω/sq. Preferably, a surface resistivity of the thermogenic layer is between 120 Ω/sq and 250 Ω/sq.

In the heating sticker of the invention, a shape of the micro block is a hexagon, a triangle, a rectangle, a trapezoid, a strip, a polygon, a circle or a combination of multiple geometrical shapes, but not limited to these.

In the heating sticker of the invention, the electrode layer is made of silver glue or metal glue, which forms the conductive wire and the ground wire by coating or printing.

In the heating sticker of the invention, the conductive wire and the ground wire are metal tiny wires with high conductivity, which are made of, but not limited to, an alloy containing silver, copper, gold, aluminum and molybdenum.

In the heating sticker of the invention, the cover layer is made of photoresist resin or thermoplastic resin. Preferably, the cover layer is made of resin containing acetate such as, but not limited to, acrylic resin.

In the heating sticker of the invention, the adhesive layer is a transparent adhesive material made of optical clear adhesive (OCA) or optical clear resin (OCR).

DETAILED DESCRIPTION

The technical contents of this disclosure will become apparent with the detailed description of embodiments accompanied with the illustration of related drawings as follows. It is intended that the embodiments and drawings disclosed herein are to be considered illustrative rather than restrictive. To simplify the drawings and increase readability, the elements shown in the figures are not depicted with a precision scale, some elements are emphasized in scale and some irrelated details are omitted.

Figure 1:
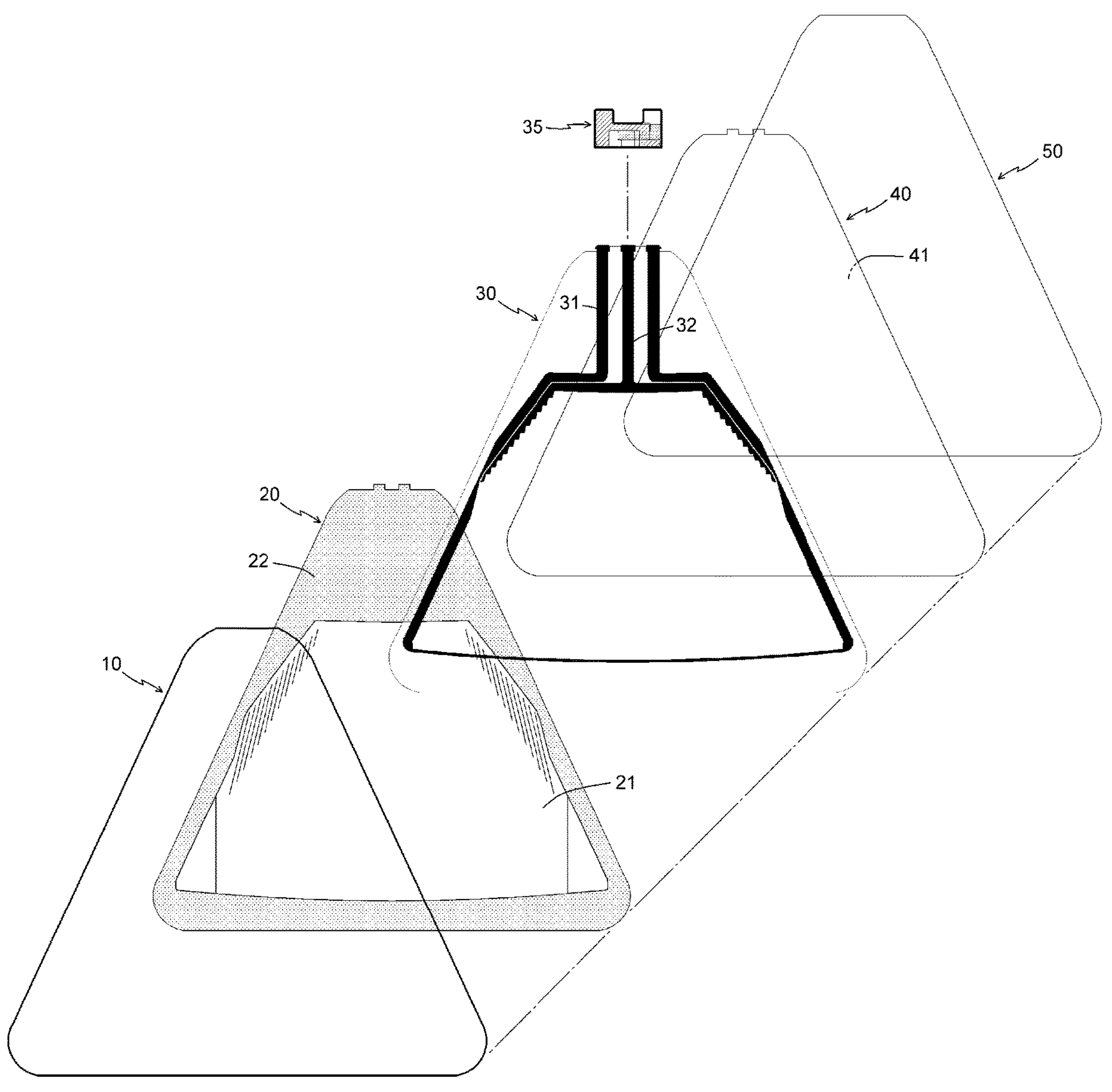
FIG. 1 is an exploded view of the invention.
Figure 2:
FIG. 2 is a schematic view of laminative structure of the invention.

As shown in FIGS. 1 and 2, the heating sticker for a vehicle window of the invention includes a protective layer 10, a thermogenic layer 20, an electrode layer 30, a cover layer 40 and an adhesive layer 50, which are laminated in order.

The protective layer 10 is a transparent film with dielectricity and flexibility, such as polyethylene terephthalate (PET) film.

Figure 3:
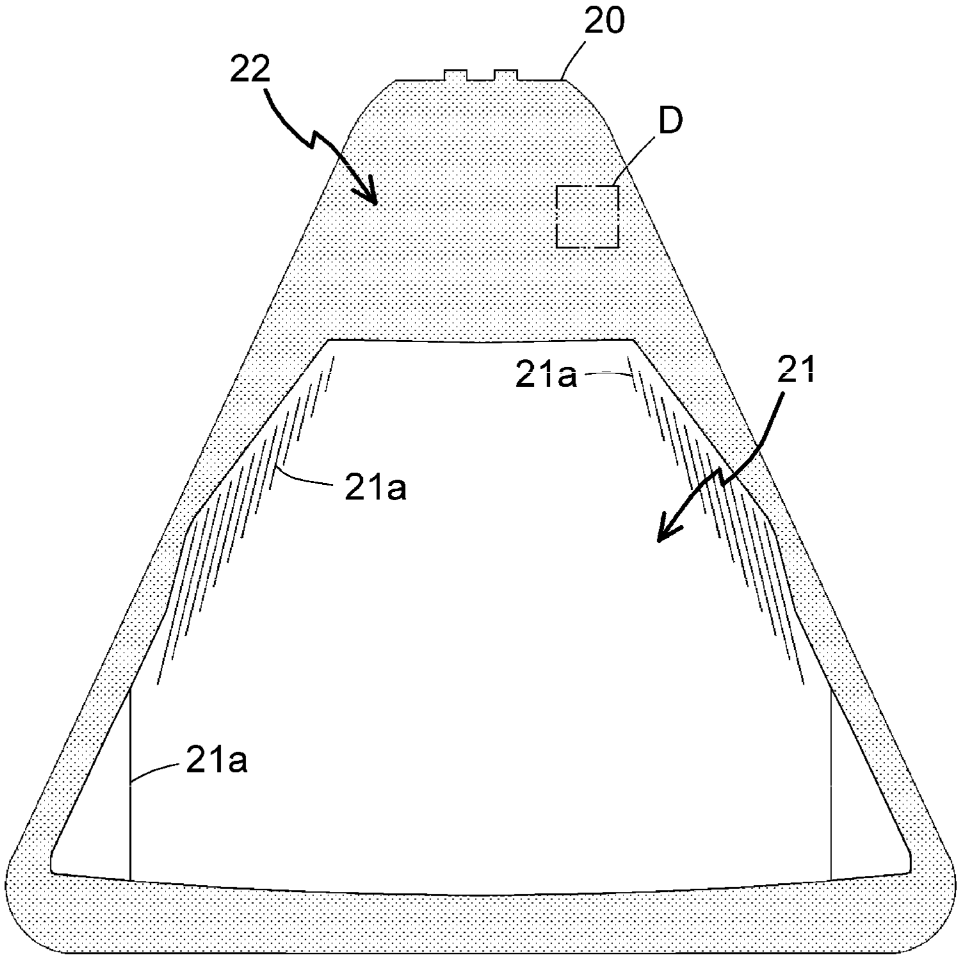
FIG. 3 is a plan view of the thermogenic layer of the invention.
Figure 4A:
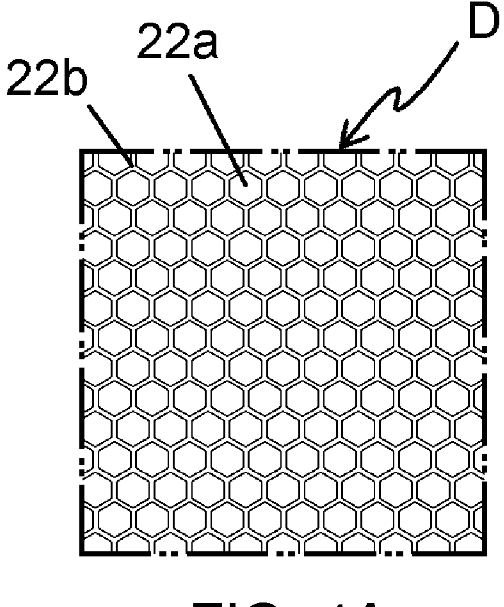
FIG. 4A is an enlarged view of part D in FIG. 3, which shows a distribution mode of hexagonal micro blocks.
Figure 4B:
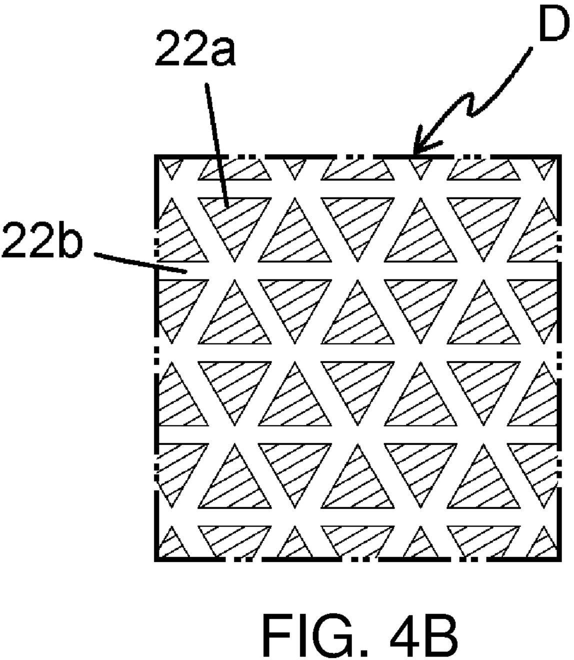
FIG. 4B is an enlarged view of part D in FIG. 3, which shows a distribution mode of triangular micro blocks.
Figure 4C:
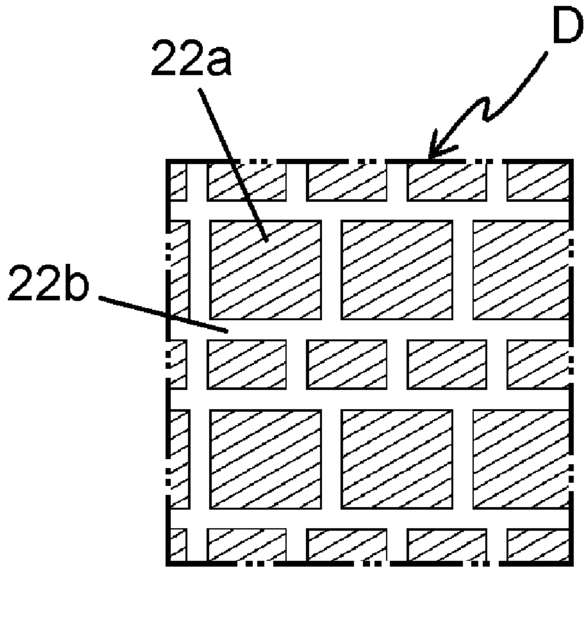
FIG. 4C is an enlarged view of part D in FIG. 3, which shows a distribution mode of another triangular micro blocks.

The thermogenic layer 20 is a conductive film with both a transparent carbon nanobud (CNB) structure and a surface resistivity between 120 Ω/sq and 350 Ω/sq. The CNB is a material that combines carbon nanotubes and spheroidal fullerenes. A CNB conductive film is formed by a coating CNB material 20*a* on a base film 20*b*. The CNB conductive film possesses great stretchability and bendability, so it is very suitable for being used on a curved vehicle window. As shown in FIG. 3, the thermogenic layer 20 is defined with a heating area 21 and a non-heating area 22. The heating area 21 is disposed with multiple insulative grooves 21*a* for guiding current distribution to implement the effect of evenly distributing heat. The non-heating area 22 is disposed with multiple micro blocks 22*a*. A gap 22*b* which is formed by a trench cut by laser is arranged between any adjacent two of the micro blocks 22*a* for isolation. A shape of the micro block 22*a* may be a hexagon as shown in FIG. 4A, a triangle as shown in FIG. 4B, a rectangle as shown in FIG. 4C or a combination of multiple geometrical shapes. The multiple micro blocks 22*a* which are isolated by cutting the CNB conductive film in the non-heating area 22 can avoid being electrified to heat up.

Figure 5:
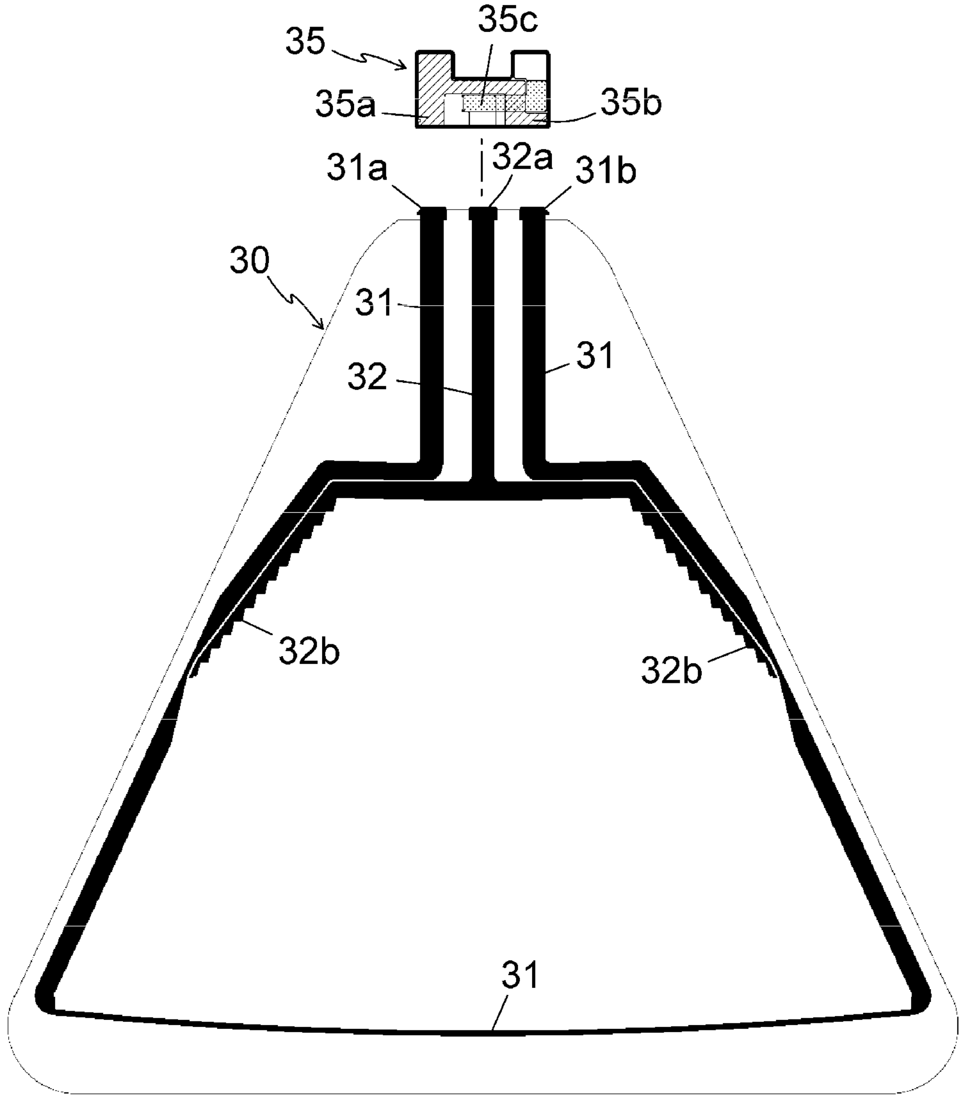
FIG. 5 is a plan view of the electrode layer of the invention.

As shown in FIG. 5, the electrode layer 30 has a conductive wire 31 and a ground wire 32. The conductive wire 31 surrounds the heating area 21 of the thermogenic layer 20 in a non-closed shape. A front end 31*a* and a rear end 31*b* of the conductive wire 31 are separately connected to current input contacts 35*a*, 35*b* of a power cable 35. The ground wire 32 is disposed between the front end 31*a* and the rear end 31*b* of the conductive wire 31. A front end 32*a* of the ground wire 32 is connected to a periphery of the heating area 31 and a rear end 32*b* of the ground wire 32 is connected to a ground point 35*c* of the power cable 35. Conductivity of each of the conductive wire 31 and the ground wire 32 is higher than conductivity of the thermogenic layer 20. For example, silver glue or metal glue with high conductivity can be used. In practice, silver glue or metal glue may be formed on the thermogenic layer 20 by coating or printing. It is noted that the conductive wire 31 and the ground wire 32 on the electrode layer 30 are not limited to a laminative structure, in practice, they may be replaced with metal tiny wires with high conductivity.

As shown in FIGS. 1 and 2, the cover layer 40 is superposed on the electrode layer 30 for protection. The cover layer 40 may adopt transparent acrylic resin. By the material properties of containing acetate ions, the cover layer 40 possesses great plasticity and stretchability to match the CNB conductive film of the thermogenic layer 20 for being used on a curved vehicle window.

Figure 6:
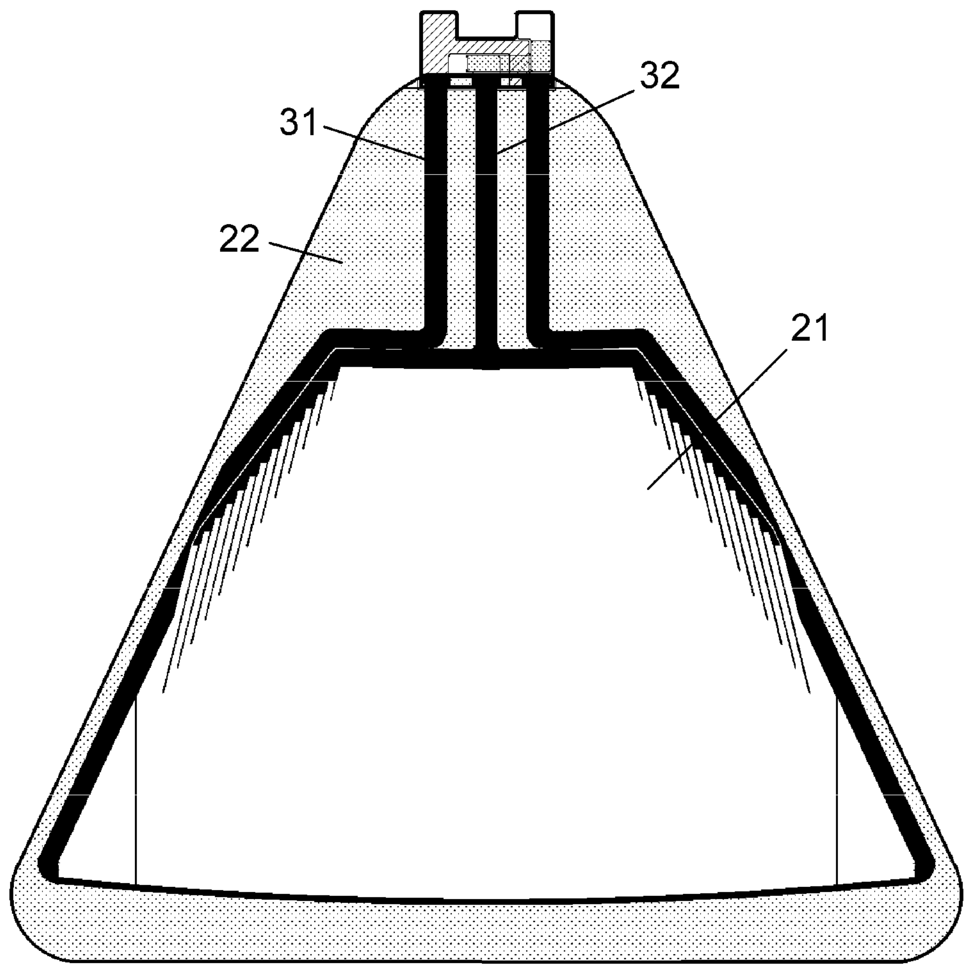
FIG. 6 is an assembled plan view of the invention.

The adhesive layer 50 is disposed on an outer surface 41 of the cover layer 40. The adhesive layer 40 is a transparent adhesive material such as optical clear adhesive (OCA) or optical clear resin (OCR). The cover layer 40 and the adhesive layer 50 are hard to be firmly combined, i.e., their junction is easily separate, so the outer surface 41 of the cover layer 40 may be treated with plasma for modifying its surface characters. The surface adhesion properties can be improved by cleaning and activating the surface to increase the combinative firmness between the cover layer 40 and the adhesive layer 50. Please refer to FIGS. 1, 2 and 6. The heating sticker of the invention can be obtained by laminating the above layers in order.

Figure 7:
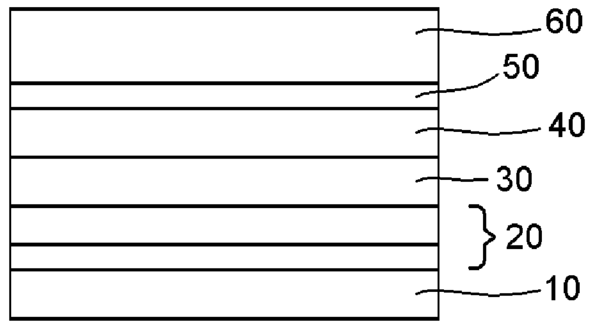
FIG. 7 is a schematic view of laminative structure of the invention, which shows the heating sticker adhered on a vehicle window.

Please further refer to FIG. 7. The heating sticker can be adhered on a vehicle window glass 60 through the adhesive layer 50. When the conductive wire 31 and the ground wire 32 are electrified, parts of the heating area 21 of the thermogenic layer 20, which are passed by currents, will proceed to make an electrothermal conversion to generate heat, the insulative grooves 21*a* in the heating area 21 guide current distribution to make the heat generated by the electrothermal conversion evenly distributed onto the whole heating area 21. This can rapidly lift the temperature of the heating area 21 to implement defogging, guarantee a driver's vision and avoid damage of components due to uneven temperature distribution. In addition, a periphery of the protective layer 10 may be disposed with a decorative bezel (not shown) for shading the non-heating area 22 of the thermogenic layer 20 and the conductive wire 31 and the ground wire 32 of the electrode layer 30 to enhance the appearance.

While this disclosure has been described by means of specific embodiments, numerous modifications and variations could be made thereto by those skilled in the art without departing from the scope and spirit of this disclosure set forth in the claims.

What is claimed is:

1. A flexible heating sticker comprising:

a protective layer comprising a transparent film having dielectricity and flexibility;

a thermogenic layer, superposed on the protective layer, comprising a conductive film having a transparent carbon nanobud structure, being defined with a heating area and a non-heating area, the heating area being disposed with multiple insulative grooves, and the non-heating area being distributed with multiple micro blocks which are arranged insulatively;

an electrode layer, superposed on the thermogenic layer, having a conductive wire and a ground wire, the conductive wire defining the heating area in a non-closed shape, a first end and a second end of the conductive wire being separately operatively coupled to a power cable, the ground wire being located between the first end and the second end of the conductive wire, a first end of the ground wire being operatively coupled to a periphery of the heating area, a second end of the ground wire being operatively coupled to the power cable, and conductivity of each of the conductive wire and the ground wire being higher than conductivity of the thermogenic layer;

a cover layer, superposed on the electrode layer, and an outer surface of the cover layer being a modified surface which is treated with plasma; and an adhesive layer, disposed on the outer surface of the cover layer.

2. The flexible heating sticker of claim 1, wherein a surface resistivity of the thermogenic layer is between 60 Ω/sq and 350 Ω/sq.

3. The heating sticker of claim 1, wherein a surface resistivity of the thermogenic layer is between 120 Ω/sq and 250 Ω/sq.

4. The flexible heating sticker of claim 1, wherein a shape of the micro blocks is a hexagon, a triangle, a rectangle, a trapezoid, a strip, a polygon, a circle or a combination of multiple geometrical shapes.

5. The flexible heating sticker of claim 1, wherein the protective layer comprises at least one of polypropylene, polyethylene, polystyrene, polymethylmethacrylate, polycarbonate, polyethylene terephthalate, polyvinyl chloride, polyimide or polyurethane.

6. The flexible heating sticker of claim 1, wherein the electrode layer comprises silver glue or metal glue.

7. The flexible heating sticker of claim 1, wherein the conductive wire and the ground wire comprise metal made of an alloy containing silver, copper, gold, aluminum and molybdenum.

8. The flexible heating sticker of claim 1, wherein the cover layer comprises a photoresist resin or thermoplastic resin.

9. The flexible heating sticker of claim 1, wherein the cover layer comprises acrylic resin.

10. The flexible heating sticker of claim 1, wherein the adhesive layer comprises a transparent adhesive material made of optical clear adhesive (OCA) or optical clear resin (OCR).

* * * * *